US012095186B2

(12) United States Patent
Genau et al.

(10) Patent No.: US 12,095,186 B2
(45) Date of Patent: Sep. 17, 2024

(54) BOARD-EDGE PLUG CONNECTOR

(71) Applicant: HARTING ELECTRONICS GMBH, Espelkamp (DE)

(72) Inventors: Marc Genau, Espelkamp (DE); Rainer Bussmann, Espelkamp (DE)

(73) Assignee: HARTING ELECTRONICS GMBH (DE)

( * ) Notice: Subject to any disclaimer, the term of this patent is extended or adjusted under 35 U.S.C. 154(b) by 346 days.

(21) Appl. No.: 17/641,013

(22) PCT Filed: Aug. 26, 2020

(86) PCT No.: PCT/DE2020/100753

§ 371 (c)(1),
(2) Date: Mar. 7, 2022

(87) PCT Pub. No.: WO2021/043370

PCT Pub. Date: Mar. 11, 2021

(65) Prior Publication Data

US 2022/0336979 A1 Oct. 20, 2022

(30) Foreign Application Priority Data

Sep. 5, 2019 (DE) ..................... 10 2019 123 829.3

(51) Int. Cl.
*H01R 12/72* (2011.01)
*H01R 13/24* (2006.01)
*H01R 13/405* (2006.01)

(52) U.S. Cl.
CPC ....... *H01R 12/721* (2013.01); *H01R 13/2407* (2013.01); *H01R 13/2435* (2013.01); *H01R 13/405* (2013.01)

(58) Field of Classification Search
CPC .................................................... H01R 12/721
See application file for complete search history.

(56) References Cited

U.S. PATENT DOCUMENTS 5,057,032 A * 10/1991 Kaufman ............... H01R 12/83 439/62
5,766,023 A 6/1998 Noschese et al. .............. 439/74
(Continued)

FOREIGN PATENT DOCUMENTS

CN 1250550 4/2000 ............. H01R 12/32
CN 101438462 5/2009 ............... H01R 9/26
(Continued)

OTHER PUBLICATIONS

International Search Report and Written Opinion issued in PCT/DE2020/100753, dated Jan. 18, 2021, with English translation, 26 pages.
(Continued)

*Primary Examiner* — Ross N Gushi
(74) *Attorney, Agent, or Firm* — HAYES SOLOWAY P.C.

(57) ABSTRACT

A board-edge plug connector establishes an electrical connection between at least one electrical conductor and at least one printed circuit board. The board-edge plug connector has a housing which accommodates at least one contact element and has at least one cavity which receives both the conductor and also the printed circuit board at least partially in the housing. The contact element both encloses and makes contact with the printed circuit board in a spring-elastic manner and also clamps the conductor against the housing and makes contact with it in a spring-elastic manner.

18 Claims, 5 Drawing Sheets

(56) References Cited

U.S. PATENT DOCUMENTS

| | | | | |
|---|---|---|---|---|
| 6,238,237 | B1 | 5/2001 | Naghata et al. | 439/493 |
| 6,527,573 | B2 * | 3/2003 | Stein, Sr. | H01R 13/193 439/260 |
| 7,794,267 | B2 * | 9/2010 | Daily | H01R 12/721 439/402 |
| 9,614,301 | B2 | 4/2017 | Ludewig et al. | H01R 4/4836 |
| 2004/0137765 | A1 | 7/2004 | Spykerman | 439/66 |
| 2016/0190720 | A1 * | 6/2016 | Lindkamp | H01R 4/2429 439/395 |
| 2017/0373405 | A1 | 12/2017 | Lappochn | H01R 4/2433 |

FOREIGN PATENT DOCUMENTS

| | | | |
|---|---|---|---|
| CN | 105594069 | 5/2016 | H01R 13/42 |
| CN | 206195034 | 5/2017 | H01R 13/46 |
| CN | 107112644 | 8/2017 | H01R 4/24 |
| CN | 107919538 | 4/2018 | H01R 4/48 |

OTHER PUBLICATIONS

International Preliminary Report on Patentability issued in PCT/DE2020/100753, dated Mar. 8, 2022, 11 pages.

Office Action issued in Chinese Patent Appln. Serial No. 202080075925.6, dated Oct. 21, 2023, with English translation, 16 pages.

* cited by examiner

BOARD-EDGE PLUG CONNECTOR

BACKGROUND OF THE INVENTION

Board-edge plug connectors of this type are required, among other things, in order to establish the connection between printed circuit boards and electrical conductors, for example a cable which is used as a signal line for a sensor.

Board-edge plug connectors for connecting cables and printed circuit boards used in a sensor housing are known particularly in the field of sensor technology.

In the field of built-in sensors, cables or associated wires are usually soldered to contact surfaces provided for this purpose on a printed circuit board. This procedure is antiquated, time-consuming, error-prone and impedes an automation process.

DE 10 2013 112 560 A1 proposes a board-edge plug connector, consisting of an insulating body and at least one electrical contact, wherein the at least one electrical contact is received in the insulating body, wherein the insulating body has two contact sides, a first contact side at which the at least one electrical contact forms a pin contact or socket contact, as well as a second contact side which has a slot, wherein the at least one electrical contact forms at least one contact arm in the slot, wherein the at least one contact arm projects into the slot, wherein a panel is provided at the second contact side of the insulating body.

Despite the fact that the solution enables casting of the proposed board-edge plug connector and the use of clamping contacts, it does require the use of an expensive, double-sided printed circuit board owing to the clamping contacts being aligned in the center of the board-edge plug connector, since single-sided printed circuit boards usually extend too high in order to be able to be installed together with the proposed board-edge plug connector in a sensor housing. Moreover, this solution does not consider that sensors, in particular built-in sensors, are often advantageously designed with their own outgoing cable.

The object of the invention involves providing a board-edge plug connector which overcomes the disadvantages of the prior art and opens up a compact and cost-effective possibility to connect in particular inexpensive, single-sided printed circuit boards to conductors designed in particular as cables in a secure and quick manner.

SUMMARY OF THE INVENTION

The invention consists of a board-edge plug connector for establishing an electrical connection between at least one electrical conductor and at least one printed circuit board. In this case, the board-edge plug connector has a housing which receives at least one contact element and has at least one cavity. The at least one cavity receives both the conductor and the printed circuit board at least partially. In this case, the contact element encloses the printed circuit board in a spring-elastic manner and contacts it. Moreover, the contact element contacts the conductor in a spring-elastic manner and clamps it against the housing. In this context, "contact" in particular means establishing an electrically conductive connection. Consequently, this means that the board-edge plug connector is designed to enclose the edge area of a printed circuit board or circuit board. At the same time, the contact element establishes an electrical connection between a printed circuit board and a conductor. A conductor is typically at least one cable which has at least one wire.

In one preferred embodiment, the at least one contact element is molded in one piece. A one-piece contact element simplifies the production of the board-edge plug connector. At the same time, production costs remain low. In particular when using a plurality of contact elements in one board-edge plug connector, the design of one-piece contact elements results in an advantage with respect to production.

In one further embodiment, the contact element encloses the printed circuit board both from the top and from the bottom in a spring-elastic clamping manner and in this way contacts the printed circuit board. This refers to the fact that the contact element is designed as a clamp at least in one area. The contact element designed as a clamp therefore acts against the printed circuit board with a force on both sides respectively at least in the plugged state of the printed circuit board. In other words, the clamp arm positioned above the printed circuit board acts against the printed circuit board with a force. The clamp arm positioned below the printed circuit board simultaneously acts against the printed circuit board with a force. This ensures electrical contact even under vibration or similar environmental influences.

Another embodiment makes provision for a board-edge plug connector, the contact element of which at least in principle has the form of a lower case Greek letter "epsilon" ($\varepsilon$). In this case, two extensions of the contact element are designed as clamps which enclose the printed circuit board in a clamping manner. According to the invention, the third extension is molded on the clamp described previously. This extension makes it possible to press a conductor, in particular a cable, against the housing and thus to establish electrical contact securely.

In one embodiment, a projection is molded on the contact element which secures the position of the contact element in the housing in a positive or non-positive manner. In other words, an extension is molded on the contact element, which extension interacts with the housing of the board-edge plug connector. For this purpose, a hook could be molded on the contact element, for example, which hook prevents the contact element from unintentionally coming out of the housing. Similarly skillful, a recess could be in the contact element, which recess is brought into engagement with a latching lug in the housing. Alternative connection possibilities are, of course, conceivable. The assembly of products in which the board-edge plug connector is used can be simplified significantly as a result.

One further embodiment makes provision for the contact element to be molded in such a way that both the printed circuit board and the conductor can be connected to the contact element without tools. However, depending on the design of the conductor, precautions must be taken if necessary for this purpose. When using a massive conductor, it is possible to insert a stripped conductor end directly into the cylindrical recess. A massive conductor is in this case intended to be understood to mean the one-piece wire of a cable, for example, comparable to building installation cables. An essentially flexible cable is preferably used here, the at least one wire of which is formed from a plurality of strands. The strands of the wire are secured at one end with wire end ferrules. By securing the at least one wire with a wire end ferrule, the conductor end can ideally be slid into an intended aperture with little effort. In this case, the contact element then presses the wire end ferrule against the housing. As a result, the conductor is, on the one hand, secured in the housing of the board-edge plug connector. On the other hand, electrical contact is established securely.

One embodiment makes provision for the housing to be molded in such a way that the contacting of the printed circuit board as well as the conductor takes place at least for the most part inside the housing. In other words, the establishment of the electrical connection takes place inside the basic form of the housing of the board-edge plug connector. Consequently, the conductors, ideally cable wires provided with wire end ferrules, are inserted into the housing. Likewise, at least the contact surfaces of a printed circuit board which are provided for this purpose are contacted inside the housing by the corresponding contact element for establishing an electrical connection.

One embodiment makes provision for the at least one cavity for receiving the printed circuit board to be molded as a groove-like opening. A continuous groove in particular simplifies the connection with printed circuit boards, the width of which is greater than the width of the housing of the board-edge plug connector. As a result, the board-edge plug connector according to the invention can be connected to different designs of printed circuit boards without any problems. In order to simplify the plug-in process, it is advisable to chamfer the groove on at least one outward facing edge.

In one further embodiment, at least one cavity for receiving the conductor is molded as an essentially cylindrical recess. This ensures that conductors which are to be inserted, in particular reinforced by a wire end ferrule, are detected by the contact element. This guarantees the establishment of the electrical connection between the contact element and conductor. For simple assembly, a chamfer is also proposed here along the essentially circular aperture of the cavity which is directed toward the cable routing.

One embodiment makes provision for a sensor for detecting a physical feature. This sensor has a sensor housing and at least one printed circuit board which is arranged in the sensor housing. In this case, a board-edge plug connector as claimed in claim 1 is used inside the sensor housing. This establishes the connection from the printed circuit board to a conductor leading out of the sensor housing. Assembly is simplified significantly by using the board-edge plug connector according to the invention. This new and simple application possibility would also make a modular sensor conceivable. A standardized sensor housing could be used for this purpose for different types of sensors and the different printed circuit boards required for this. The conductors coming from the sensor can also be preassembled in large quantities. These possibilities enable a cheap and uncomplicated manufacturing process. Moreover, there would even be the possibility of offering sensors for field assembly. This means that sensors can be offered as a kit. They could be put together/assembled by the end user on sight at the location as required, without having to anticipate excessive time losses. Moreover, a certain modularity can be created by using a board-edge plug connector according to the invention. If a sensor is designed with plug contacts, for example, for connecting to a plug connector, a module can be produced which receives the desired plug contacts in a required plug-in face. On the side directed toward the sensor interior, this module thus has suitable conductor elements which can be plugged into the board-edge plug connector. There, the conductor elements are firstly releasably fixed by the contact element and establish the electrically conductive connection between the plug contacts for a mating plug connector and printed circuit board in the sensor housing.

One embodiment is characterized by that fact that the contact element both encloses and contacts the printed circuit board in a spring-elastic manner and displaces and contacts an insulating layer of the conductor. This means that a contact area of the contact element is designed to displace the insulation of an electrically conductive cable, in order to expose the electrically conductive layer and at the same time to establish an electrically conductive connection.

In one embodiment, in order to displace the insulation of the electrical conductor, the contact element is designed with at least one contact area which is substantially designed as an insulation displacement connector.

In one embodiment, by using an insulation displacement connector, it is recommended that the conductor is firstly received by the housing before the contact element is inserted into the housing. This saves the necessity for wire end ferrules in the case of flexible conductors. It also reduces time expenditure during assembly.

Alternatively, one embodiment of the board-edge plug connector makes provision for a contact element with an insulation displacement connector, wherein the housing has a cover which forces the conductor into the contact area at least during assembly. This embodiment therefore enables a particularly simplified and quick assembly by placing at least one conductor to be contacted onto the housing or onto a contact area of the contact element designed as an insulation displacement connector. The conductor is subsequently pressed into the insulation displacement connector of the contact element by means of the cover, which displaces the insulation and establishes electrical contact.

In one embodiment, the cover of the housing is molded on the housing in a materially bonded manner and can be swiveled at least for assembly purposes. This prevents parts of the board-edge plug connector from going missing in the case of small components.

One embodiment makes provision for the lid of the housing to be provided with at least one latching element which is brought into connection with at least one corresponding latching element of the housing after assembly. This ensures sustainable and secure contacting of the conductor with the contact element.

BRIEF DESCRIPTION OF THE DRAWINGS

One exemplary embodiment of the invention is represented in the drawings and is explained in greater detail hereinafter. In the drawings.

The figures include partially simplified, schematic representations. In part, identical reference numbers are used for the same but possibly not identical elements. Different views of the same elements could be scaled differently. Directional information such as “left”, “right”, “above” and “below” are intended to be understood with reference to the respective figure and may vary in the individual representations compared to the object represented.

DETAILED DESCRIPTION OF THE INVENTION

Figure 1:
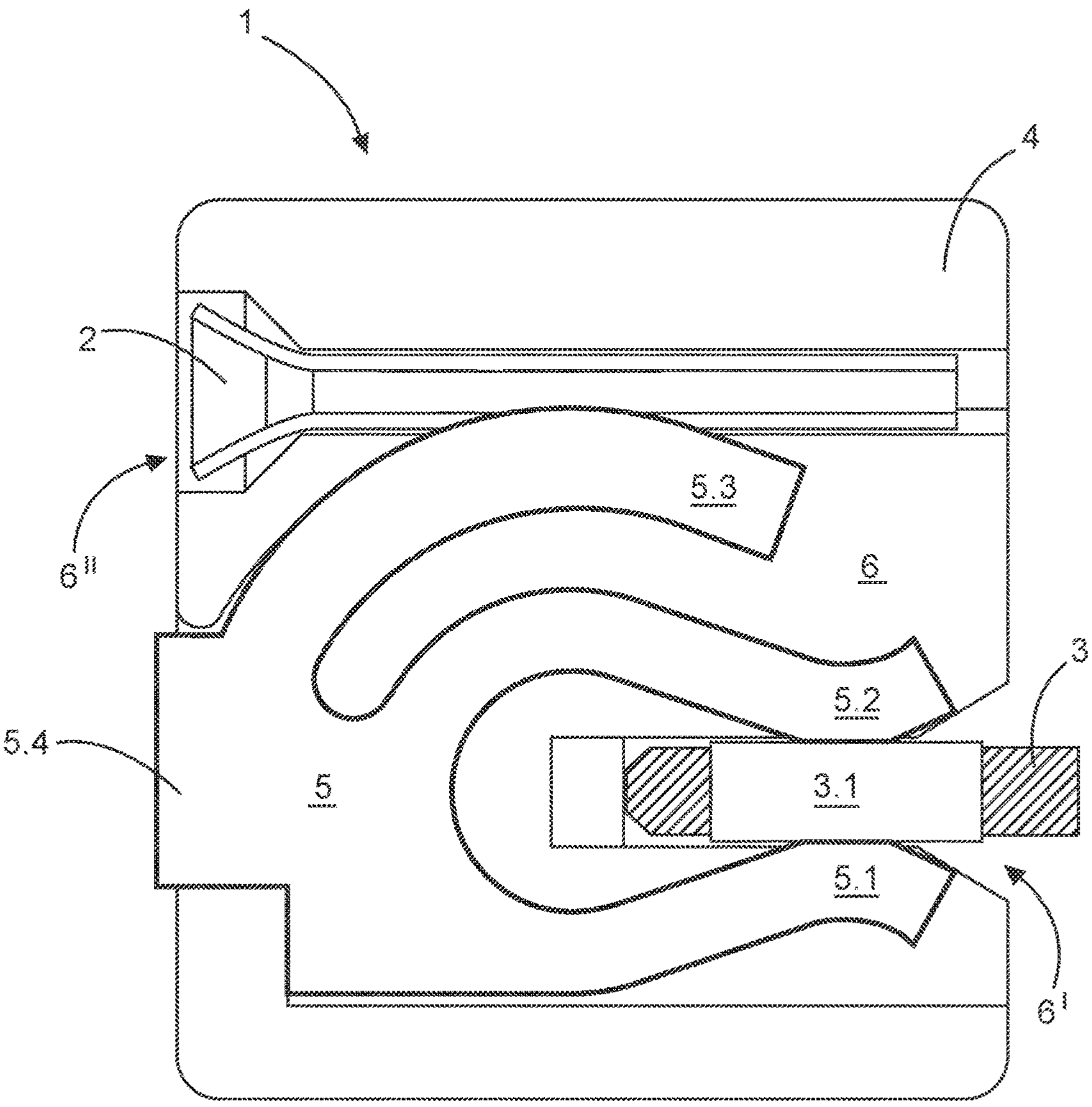
FIG. 1 shows a board-edge plug connector according to the invention in a sectional representation.

FIG. 1 shows a longitudinal section of a board-edge plug connector 1 according to the invention. In this case, a wire end ferrule is used as an example for a conductor 2. Moreover, a section of a printed circuit board 3 is shown with an associated contact surface 3.1. The housing 4 is essentially rectangular and in the embodiment represented has rounded corners/edges. The contact element 5 according to the invention is designed with three extensions 5.1, 5.2 and 5.3 which are designed to be spring elastic. The contact element 5 has a projection 5.4 for this purpose. The projection 5.4 is brought into positive engagement with a cutout in the housing 4. Moreover, FIG. 1 shows a cavity 6 which has an opening 6' which makes it possible to receive a printed circuit board 3, and a substantially cylindrical recess 6" for receiving a conductor 2. In this case, the extensions 5.1 and 5.2 establish an electrically conductive connection with the printed circuit board 3 by said extensions 5.1 and 5.2 of the contact element 5 applying to each side of the contact surface 3.1 respectively a force which is directed toward the printed circuit board 3. The third extension 5.3 of the contact element 5 is arranged above the extensions 5.1 and 5.2 which form a clamp. The shape of the clamp substantially resembles a variation of the lower case Greek letter "epsilon" (ε). The clamping function of the extension 5.3 of the contact element 5 also becomes clear. The extension 5.3 contacts the conductor 2, designed as a wire end ferrule and acts on it with a force which acts against the conductor. The effective direction of the force causes the conductor 2 to be pressed to the interior wall of the cylindrical recess 6" of the housing 4 and thus to be held securely in position. At the same time, the electrically conductive connection between the represented conductor 2 and the contact element 5 or the extension 5.3 is guaranteed.

Figure 2:
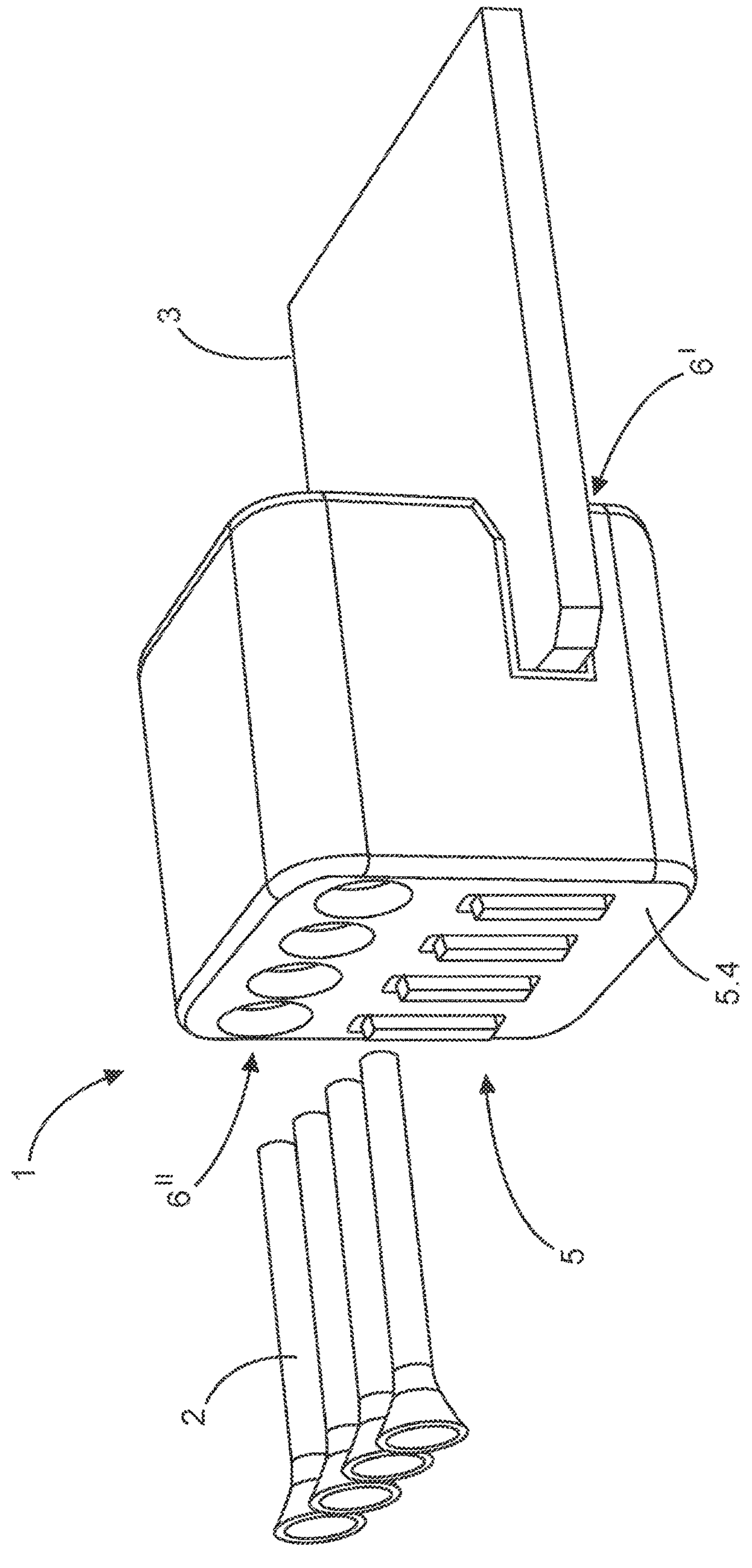
FIG. 2 shows a perspective representation of a board-edge plug connector according to the invention.

FIG. 2 shows a board-edge plug connector 1 according to the invention in a perspective view. For this purpose, four chamfered cylindrical recesses 6" are represented which are designed to receive at least a portion of the wire end ferrules shown by way of example as conductors 2. The contact elements 5 used can be identified in this view merely by the projections 5.4 protruding out of the housing 4. A groove-like opening 6' can be identified on the side of the housing 4 opposite the cylindrical recesses 6". This opening 6' makes it possible to receive printed circuit boards 3 even if the width of the printed circuit boards 3 exceeds the width of the housing 4.

Figure 3:
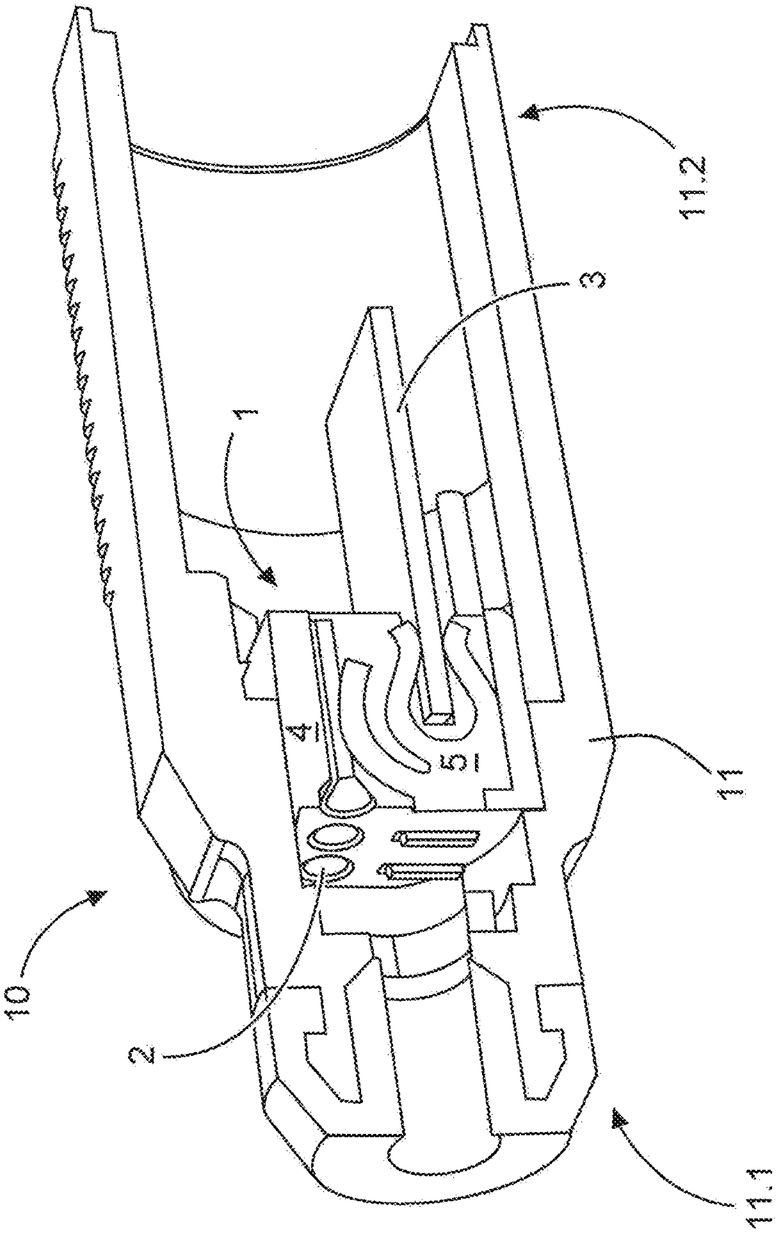
FIG. 3 shows a sensor housing with an inserted board-edge plug connector according to the invention.

FIG. 3 shows a preferred use of the board-edge plug connector 1 according to the invention. In this case, it is the sensor housing 10 of a sensor 11. In particular, the possible use of a board-edge plug connector 1 according to the invention becomes clear. The board-edge plug connector 1 is located at an end of the sensor housing 11 which is provided as a cable outlet 11.2. In this case, the board-edge plug connector 1 is oriented in such a way that the cylindrical recesses 6" are directed toward the cable outlet 11.2. Correspondingly vice versa, the opening 6' with a printed circuit board 3 located therein is aligned in the direction of the sensor end 11.2.

Figure 4:
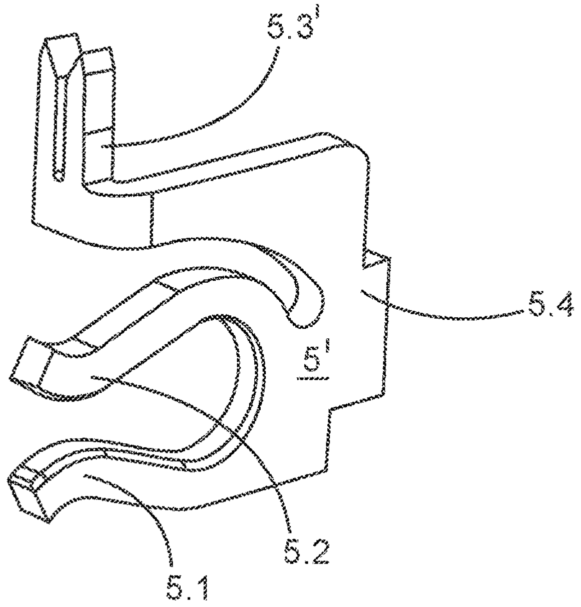
FIG. 4 shows an alternative embodiment of a contact element of the board-edge plug connector.

FIG. 4 represents an alternative embodiment of a contact element 5' which can be used in a board-edge plug connector 1' according to the invention. In this case, the contact element 5' with its contact areas 5.1 and 5.2 is comparable to the contact areas shown previously. However, the contact area 5.3' differs significantly from the contact area 5.3. This is due to the fact that the contact area 5.3' is substantially designed as an insulation displacement connector in FIGS. 4 and 5. This insulation displacement connector cuts through an insulating sheath of an electrical conductor 2' and in this way establishes contact.

Figure 5:
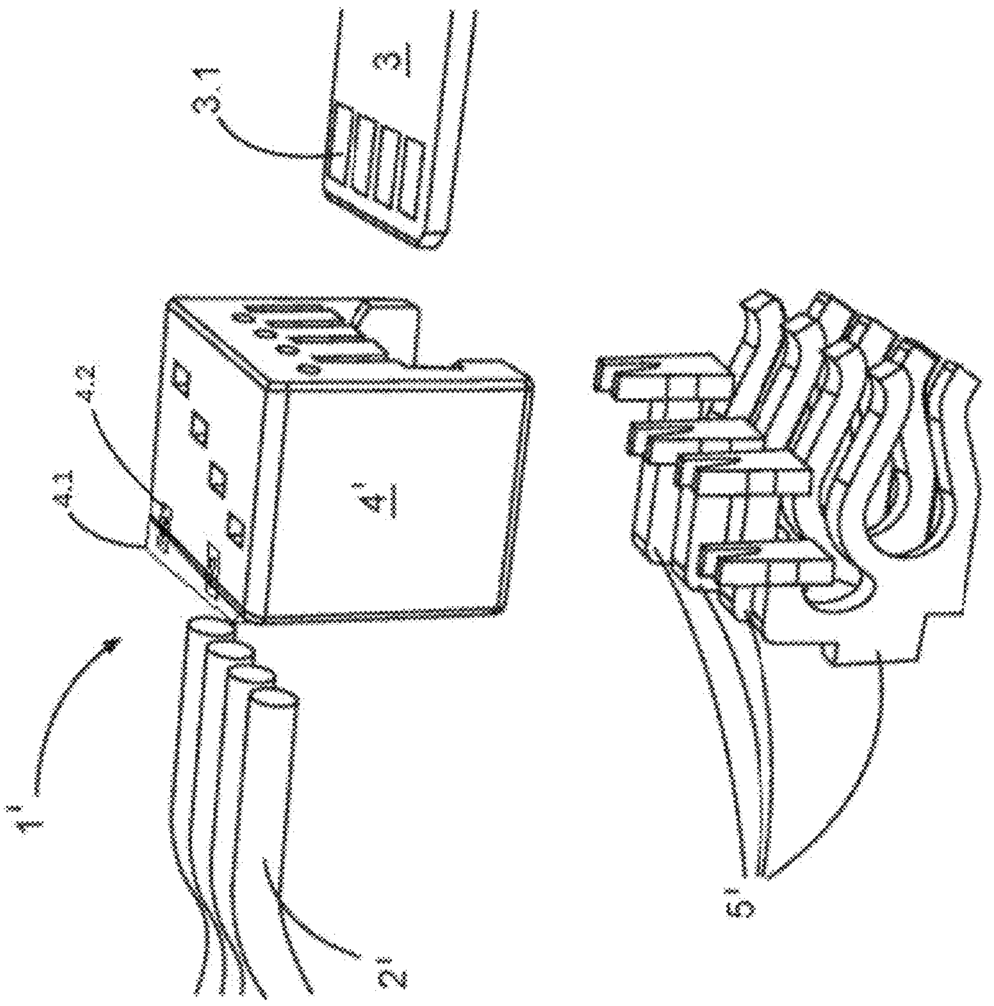
FIG. 5 shows an alternative embodiment of a board-edge plug connector in an exploded view.

FIG. 5 shows an exploded representation of an alternative embodiment of the board-edge plug connector 1'. It is possible to also identify a useful assembly sequence in this FIG. 5. For this purpose, the conductors 2' are inserted into the housing 4'. As soon as these conductors 2' reach a stop (not shown) located in the housing 4', the alternative contact elements 5' are slid into the housing 4'. During the slide-in process, the insulation of the conductors 2' is cut and displaced. Lastly, a printed circuit board 3 with contact surfaces 3.1 located thereon is plugged into the housing 4', whereby the contact elements 5' establish the electrical connection between the conductors 2' and the printed circuit board 3. The housing 4' may have a cover 4.1 which forces the conductors 2' into the contact area 5.3 of the contact element 5, at least during assembly of the board-edge plug connector 1'. The cover 4.1 of the housing 4' may be molded onto the housing 4' in a materially bonded manner which may be swiveled at least during assembly of the board-edge plug connector 1', preventing parts of the board-edge plug connector 1' from going missing in the case of small components. Additionally, the cover 4.1 of the housing 4' may be provided with at least one latching element 4.2 which is brought into connection with at least one corresponding latching element 4.2 of the housing after assembly.

It is clear to the person skilled in the art—unless otherwise specified—that the combinations represented and discussed are not the only possible combinations, even if different aspects or features of the invention are in each case shown in combination in the figures. In particular, mutually corresponding units or feature complexes from different exemplary embodiments can be exchanged with one another.

Board-Edge Pluq Connector

LIST OF REFERENCE NUMBERS

1 board-edge plug connector
2 electrical conductor
3 printed circuit board
3.1 contact surface
4 housing
4.1 cover
4.2 latching element
5, 5' contact element
5.1, 5.2, 5.3 contact areas
5.4 projection
cavity
6' groove-like opening
6" cylindrical recess
10 sensor
11 sensor housing
11.1 cable outlet
11.2 sensor end

The invention claimed is:

1. A board-edge plug connector for establishing an electrical connection between at least one electrical conductor and at least one printed circuit board the board-edge plug connector comprising:
   a housing which receives at least one contact element and has at least one cavity which receives both the conductor and the printed circuit board at least partially into the housing, wherein
the contact element both encloses and contacts the printed circuit board in a spring-elastic manner and clamps the conductor against the housing and contacts it in a spring-elastic manner, wherein
the contact element has the form of a lower case Greek letter "epsilon" (ε), and
wherein two spring-elastic contact areas enclose and contact a contact surface of the printed circuit board.

2. The board-edge plug connector as claimed in claim 1, wherein the contact element is molded in one piece.

3. The board-edge plug connector as claimed in claim 1, wherein the contact element encloses and contacts the printed circuit board both from a top and from a bottom in a spring-elastic clamping manner.

4. The board-edge plug connector as claimed claim 1, wherein a projection is molded on the contact element, wherein the projection secures the position of the contact element in the housing by positive or non-positive locking.

5. The board-edge plug connector as claimed in claim 1, wherein the contact element is molded, wherein both the printed circuit board and the conductor can be connected to the contact element without tools.

6. The board-edge plug connector as claimed in claim 1, wherein the housing is molded, wherein the contacting of the printed circuit board and the conductor takes place substantially inside the housing.

7. The board-edge plug connector as claimed in claim 1, wherein the at least one cavity for receiving the printed circuit board is molded as a groove-like opening.

8. The board-edge plug connector as claimed in claim 1, wherein the at least one cavity for receiving the conductor and the printed circuit board is molded as an essentially cylindrical recess.

9. A sensor for detecting a physical feature with a sensor housing and at least one printed circuit board which is arranged in the sensor housing, the sensor comprising:

a board-edge plug connector as claimed in claim 1 that is used inside the sensor housing and establishes the connection from the printed circuit board to a conductor leading out of the sensor housing.

10. A board-edge plug connector for establishing an electrical connection between at least one electrical conductor and at least one printed circuit board the board-edge plug connector comprising:

a housing which receives at least one contact element and has at least one cavity which receives both the conductor and the printed circuit board at least partially into the housing, wherein the contact element both encloses and contacts the printed circuit board in a spring-elastic manner and displaces and contacts an insulating layer of the conductor, wherein that contact element has the form of a lower case Greek letter "epsilon" (ε), and wherein two spring-elastic contact areas enclose and contact a contact surface of the printed circuit board.

11. The board-edge plug connector as claimed in claim 10, wherein at least one contact area is substantially designed as an insulation displacement connector.

12. The board-edge plug connector as claimed in claim 10, wherein for assembly purposes, the conductor is firstly received by the housing before the contact element is inserted into the housing.

13. The board-edge plug connector as claimed in claim 10, wherein the housing has at least one cover which forces the conductor into the contact area at least during assembly.

14. The board-edge plug connector as claimed in claim 10, wherein a cover of the housing is molded on the housing in a materially bonded manner and is swiveled at least for assembly purposes.

15. The board-edge plug connector as claimed in claim 13, wherein the cover of the housing is provided with at least one latching element which is brought into connection with at least one corresponding latching element of the housing after assembly.

16. The board-edge plug connector as claimed in claim 10, wherein the contact element is molded in one piece.

17. The board-edge plug connector as claimed in claim 10, wherein the contact element encloses and contacts the printed circuit board both from a top and from a bottom in a spring-elastic clamping manner.

18. The board-edge plug connector as claimed in claim 10, wherein a projection is molded on the contact element, wherein the projection secures the position of the contact element in the housing by positive or non-positive locking.

* * * * *